UNITED STATES PATENT OFFICE.

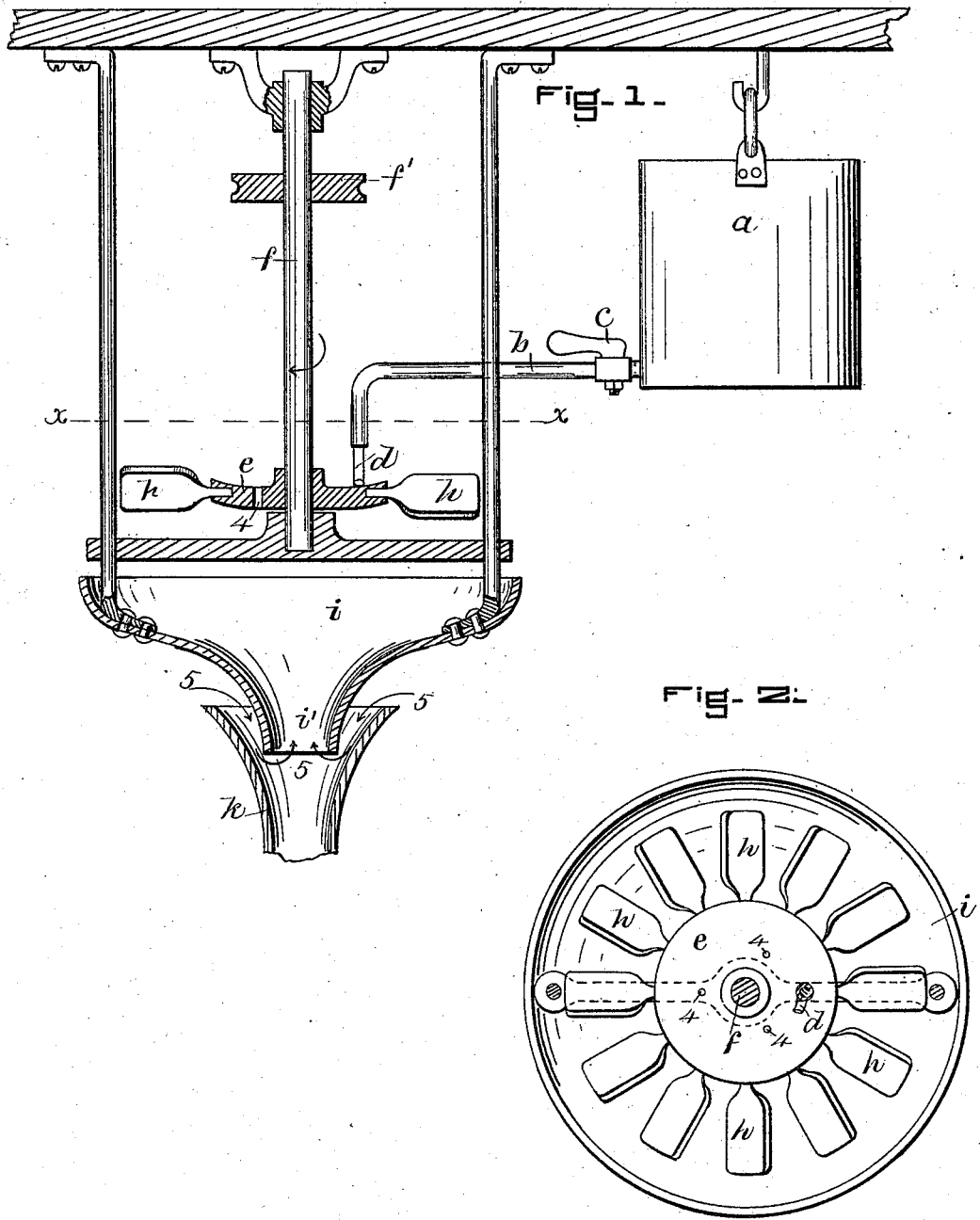

GEORGE D. BANCROFT, OF SPRINGFIELD, ASSIGNOR TO TIMOTHY MERRICK, OF HOLYOKE, MASSACHUSETTS.

APPARATUS FOR MOISTENING AIR IN BUILDINGS.

SPECIFICATION forming part of Letters Patent No. 287,898, dated November 6, 1883.

Application filed March 9, 1883. (No model.)

*To all whom it may concern:*

Be it known that I, GEORGE D. BANCROFT, of Springfield, Hampden county, Massachusetts, have invented an Improvement in Apparatus for Moistening Atmosphere in Buildings, of which the following description, in connection with the accompanying drawings, is a specification, like letters on the drawings representing like parts.

My invention relates to an apparatus for moistening air in apartments, as is found to be desirable in weaving-rooms, flouring-mills, and similar places; and it has for its object to cause the water or moisture to be more perfectly commingled with the air than has been accomplished by the moistening apparatus heretofore used for this purpose, by which the water is delivered in the form of spray, and is imperfectly mingled with the air, so that considerable amounts settle and wet the floor of the building or objects therein.

In moistening air in accordance with the present invention water is delivered, in the form of a thin sheet or film, by means of wicking or equivalent flexible porous material upon the rapidly-moving surface of a rotating disk or wheel, from which it is thrown by centrifugal force in an exceedingly comminuted state. The finely-comminuted water discharged from the disk is preferably taken up and distributed by a current of air through the apartment, and the said air-current is preferably produced by a series of fan-blades attached to or carried by the said disk. The apparatus thus operates to maintain a circulation of air as well as to provide the air with moisture.

Before my invention the administration of medicines by inhalation has been effected by distributing such medicines in an atomized condition in an apartment by means of revolving radial tubes having contracted nozzles, the centrifugal action of which tubes projects the liquid in fine streams against oppositely-revolving flat plates, by which the liquid is atomized and diffused. My invention in air-moistening differs from this in dispensing with tubes and in spreading water upon a discous surface, from which it is thrown in films, which are taken up by induced air-currents and diffused.

Figure 1 is a vertical section of an apparatus for moistening the air in accordance with this invention, and Fig. 2 a horizontal section thereof on line *x x*, Fig. 1.

The water to supply the moisture that is to be imparted to the air is contained in any suitable receptacle, *a*, having an outlet-pipe, *b*, controlled by a suitable stop-cock, *c*, the said pipe being provided at its outlet end with wicking *d*, or equivalent flexible porous material, resting, preferably, in contact with the water-comminuting device, shown as a disk or wheel, *e*, mounted on a shaft, *f*, supported in suitable bearings and adapted to be driven from the shafting in the mill or building at a high rate of speed. The wicking *d* constitutes a spreading device, by which the water is applied as a thin film to the surface of the said disk *e*, from which it is thrown in so finely divided or comminuted a state by centrifugal action that it will readily commingle with the air and not settle or fall as a spray to the floor, or upon objects beneath. At the same time with the diffusion and distribution of the water as thus described a current of air is preferably produced by suitable fans or blades *h*, inclined to the plane of rotation of the disk *e* in such a manner as to produce an upward current of air, crossing the path of the finely divided or comminuted water or moisture thrown off from the disk *e*, and thus absorbing the said moisture and conveying and distributing it throughout the apartment.

A funnel or guide, *i*, is hung below the disk *e* and its wings *h*, the apex or orifice *i'* of the funnel opening into the flaring mouth *k* of a drip or discharge pipe, by which any overflow or drip of water may be carried off, so as to cause no damage, the disk *e* being provided with drip-passages 4, to permit the water to flow into the said funnel and drip-pipe when, for any reason, it fails to be properly thrown off from the said disk. The action of the wings *h* in producing an upward current will have a tendency to rarefy the air in the guide *i*, causing air to be drawn in between the opening *i'* thereof, and the mouth *k* of the discharge-pipe, and through the said guide, as shown by the arrows 5, thus taking the drier atmosphere from a lower level and discharging moistened air at a higher level.

The invention is not limited to the precise form of apparatus illustrated, as it is obvious that various modifications in the construction and arrangement of the different parts may be made without departing from the invention.

Instead of attaching the cam-blades to the disk e, they may be attached to a second disk mounted on the spindle f below the disk e.

I claim—

1. The combination, substantially as shown and described, of the reservoir a, the pipe b, leading therefrom, and provided with a cock, c, for regulating the flow from said reservoir, the flexible porous distributing device d, connected with said pipe, the rotary disk e, upon which the liquid is spread or distributed, and a fan, through the medium of which the comminuted liquid is diffused.

2. The combination, substantially as shown and described, of the horizontal rapidly-rotating disk e, a water-feeder, and the wicking d, in connection with such feeder, for distributing water in a film or thin body upon said disk.

3. The combination, substantially as shown and described, of the water-feeder, the horizontally-arranged rapidly-revolving water-comminuting disk e, the wicking d, and the fans or blades h.

4. The water-feeder and the water-comminuting disk, combined with a fan for producing an air-current, whereby the moisture thrown from the said disk is absorbed and distributed, substantially as described.

5. The combination of the water-comminuting disk and fan with a guide through which an air-current is drawn by the said fan, substantially as described.

6. The water-comminuting disk and fan, combined with the funnel or guide, and the discharge-pipe having a flaring mouth surrounding the apex or orifice of the said funnel, substantially as described.

In testimony whereof I have signed my name to this specification in the presence of two subscribing witnesses.

GEORGE D. BANCROFT.

Witnesses:
G. W. GREGORY,
B. J. NOYES.